US010388438B2

(12) United States Patent
Luzzi

(10) Patent No.: US 10,388,438 B2
(45) Date of Patent: Aug. 20, 2019

(54) PUSH ON ARRESTER

(71) Applicant: Richards Manufacturing Company Sales, Inc., Irvington, NJ (US)

(72) Inventor: Glenn J. Luzzi, Mt. Bethel, PA (US)

( * ) Notice: Subject to any disclaimer, the term of this patent is extended or adjusted under 35 U.S.C. 154(b) by 188 days.

(21) Appl. No.: 15/222,911

(22) Filed: Jul. 28, 2016

(65) Prior Publication Data

US 2017/0148553 A1 May 25, 2017

Related U.S. Application Data

(63) Continuation-in-part of application No. 13/844,033, filed on Mar. 15, 2013, now Pat. No. 9,728,307.

(51) Int. Cl.

| | |
|---|---|
| ***H02H 1/00*** | (2006.01) |
| ***H01C 7/12*** | (2006.01) |
| ***H02G 13/00*** | (2006.01) |
| ***H01R 13/53*** | (2006.01) |
| ***H01R 31/06*** | (2006.01) |
| *H01R 4/48* | (2006.01) |
| *H01R 4/56* | (2006.01) |

(52) U.S. Cl.
CPC ............... *H01C 7/12* (2013.01); *H01R 13/53* (2013.01); *H01R 31/06* (2013.01); *H02G 13/80* (2013.01); *H01R 4/48* (2013.01); *H01R 4/56* (2013.01)

(58) Field of Classification Search
USPC .......................................................... 361/127
See application file for complete search history.

(56) References Cited

U.S. PATENT DOCUMENTS

| | | | | |
|---|---|---|---|---|
| 5,309,313 A * | 5/1994 | Yaworski | H01T 1/15 361/117 |
| 5,923,518 A * | 7/1999 | Hensley | H01T 1/14 361/117 |
| 6,392,861 B1 * | 5/2002 | Trinh | H01C 7/12 361/111 |
| 8,328,569 B2 * | 12/2012 | Roscizewski | H01R 4/26 439/187 |
| 2006/0216992 A1 * | 9/2006 | Hughes | H01R 13/53 439/607.01 |
| 2010/0149715 A1 * | 6/2010 | Yaworski | H01C 7/12 361/127 |
| 2016/0094021 A1 * | 3/2016 | Ramarge | H02G 13/00 174/2 |
| 2017/0148553 A1 * | 5/2017 | Luzzi | H01C 7/12 |

* cited by examiner

*Primary Examiner* — Ronald W Leja
(74) *Attorney, Agent, or Firm* — Bakos & Kritzer

(57) ABSTRACT

An arrester is disclosed capable of coupling a cable accessory utilizing a push on method. The arrester comprises a body having a surge arrester portion, a receiving portion, and a conductive contact. The receiving portion is configured to couple to a coupling fastener comprising a first side, second side, and a latching mechanism. Various methods of engaging and disengaging the arrester to a cable accessory utilizing the coupling fastener are disclosed.

5 Claims, 8 Drawing Sheets

300 302 304 200 204 202 206 208 210 102 122 106 108 110 100 124 112 104 114 116 120 118

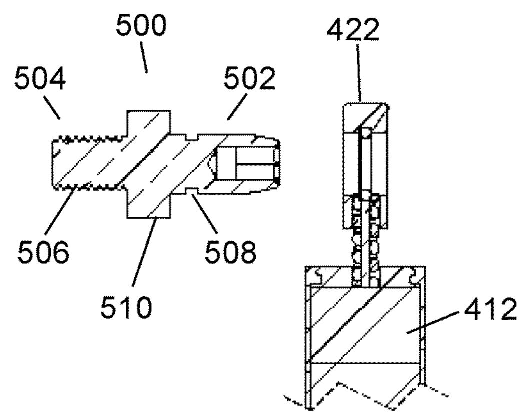
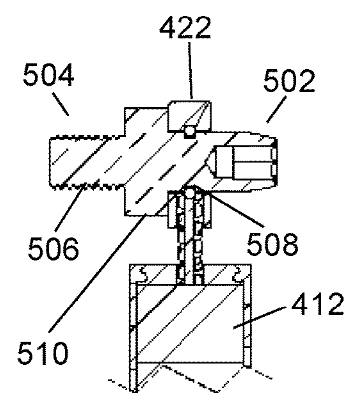
*Fig. 3A*
*Fig. 3B*
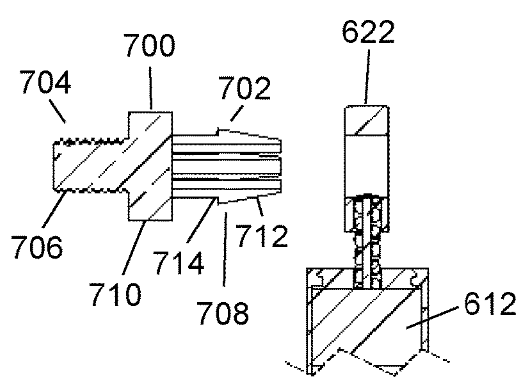
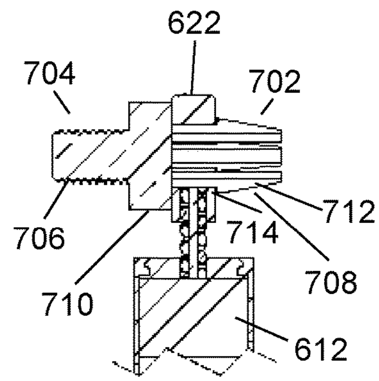
*Fig. 4A*
*Fig. 4B*

PUSH ON ARRESTER

CROSS-REFERENCE TO RELATED APPLICATION

This application is a continuation-in-part of co-pending application U.S. patent application Ser. No. 13/844,033, filed on Mar. 15, 2013, and entitled "R-Stack Arrester," which is hereby incorporated by reference herein in its entirety, including any figures, tables, equations or drawings.

TECHNICAL FIELD

The apparatus disclosed herein generally relates to the field of surge arresters, and more particularly to an elbow body arrester used for underground and overhead electrical systems.

BACKGROUND

Conventional surge arresters protect underground and overhead electrical systems from transient over-voltage surges from lightning, switching, and the like. Traditionally, a 200 Ampere (200 A) elbow arrester configuration is used to address the surges. In this configuration, the bushing of the desired apparatus designed to protect against the surges is connected to a first portion of the elbow connection. An arrester, typically consisting of metal oxide varistor (MOV) elements, is positioned in the second portion of the elbow connector. The MOV elements and bushing are electrically connected in an intermediate portion of the first part of the elbow connection. A ground connector—which is positioned at an end of the second portion of the elbow connector—is electrically connected to the MOV on a first end and coupled to an external ground on a second end. Therefore, a voltage is applied across the MOV elements from the bushing connection of the apparatus and ground. At steady state, the MOV elements have a relatively high impedance, however as the voltage applied across the elements increases, such as from a lightning surge, the impedance of the MOV elements decreases until a breakdown voltage, wherein the impedance rapidly decreases towards zero. As a result, the MOV elements become highly conductive and serve to conduct transient current from the surge voltage to ground, thereby protecting the apparatus. Such elbow arrester configurations include a pulling eye, which enables a lineman to install and remove the arrester utilizing a fiberglass hot stick attached to the pulling eye.

In applications of loads higher than 200 A, a bolted-style connector system requires an adapter known as a load break reducing tap plug (LRTP), which, in conjunction with an extender is coupled to the first portion of the 200 A elbow arrester. Exemplary bolted-style connector systems include but are not limited to 400 A, 600 A, and 700 A. The inherent disadvantage of using such a system is that the additional parts introduce a higher impedance, installation complexities, and fault points for the system. In addition, the increased overall stack height of the system can make it difficult to install in underground systems where space allocation is limited.

Such inherent disadvantages in known systems have not been entirely ignored in the industry. One method of eliminating the load break reducing tap plug incorporates the arrester block directly into an apparatus capable of mating with, and latching to, a standard bolted-style bushing connector. This method typically requires a connector that is bolted and torqued to the bushing. A disadvantage of this method is that assembly and removal of the bolted connector can be difficult and require additional tools.

Therefore, a need exists in the field for an arrester with a push on method of coupling to a cable accessory.

BRIEF SUMMARY

An arrester capable of coupling a cable accessory utilizing a push on method is disclosed. The arrester comprises a body having a receiving portion, a surge arrester portion, and a conductive contact. The conductive contact is configured to couple to a coupling fastener inserted into the receiving portion. The coupling fastener comprises a first side, second side, and a latching mechanism. In the preferred embodiment, the method of coupling the arrester to a cable accessory begins with coupling (e.g., a threaded connection) the second side of the coupling fastener to a cable accessory. Thereafter, the first side of the coupling fastener can be coupled to the conductive contact of the arrester and latched utilizing a push on method. Various other methods of engaging and disengaging the arrester to the cable accessory utilizing the coupling fastener are disclosed herein.

BRIEF DESCRIPTION OF THE DRAWINGS

The detailed description makes reference to the accompanying figures wherein:

FIG. 3A illustrates a cross-sectional side view of an exemplary coupling fastener according to an embodiment of the broad inventive concepts disclosed herein;

FIG. 3B illustrates a cross-sectional side view of the coupling fastener shown in FIG. 3A coupled to an exemplary arrester;

FIG. 4A illustrates a cross-sectional side view of an exemplary coupling fastener according to an embodiment of the broad inventive concepts disclosed herein;

FIG. 4B illustrates a cross-sectional side view of the coupling fastener shown in FIG. 4A coupled to an exemplary arrester;

Other objects, features, and characteristics of the broad inventive concepts disclosed herein, as well as methods of operation and functions of the related elements of the structure and the combination of parts, will become more apparent upon consideration of the following detailed description with reference to the accompanying drawings.

DETAILED DESCRIPTION OF THE PREFERRED EMBODIMENT

A detailed illustration of the preferred embodiment is disclosed herein. However, techniques, methods, processes, systems, and operating structures in accordance with the inventive concepts disclosed herein may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure.

None of the terms used herein, including "arrester," "contact," "portion," and "section" are meant to limit the application of the broad inventive concepts. The terms are used to illustrate the preferred embodiment and are not intended to limit the scope of the broad inventive concepts disclosed herein. Similarly, the use of these terms is not meant to limit the scope or application of the inventive concepts, as the inventive concepts are versatile and can be utilized in many applications, as will be apparent in light of the disclosure set forth herein. The following presents a detailed description of the preferred embodiment with reference to the figures.

Figure 1:
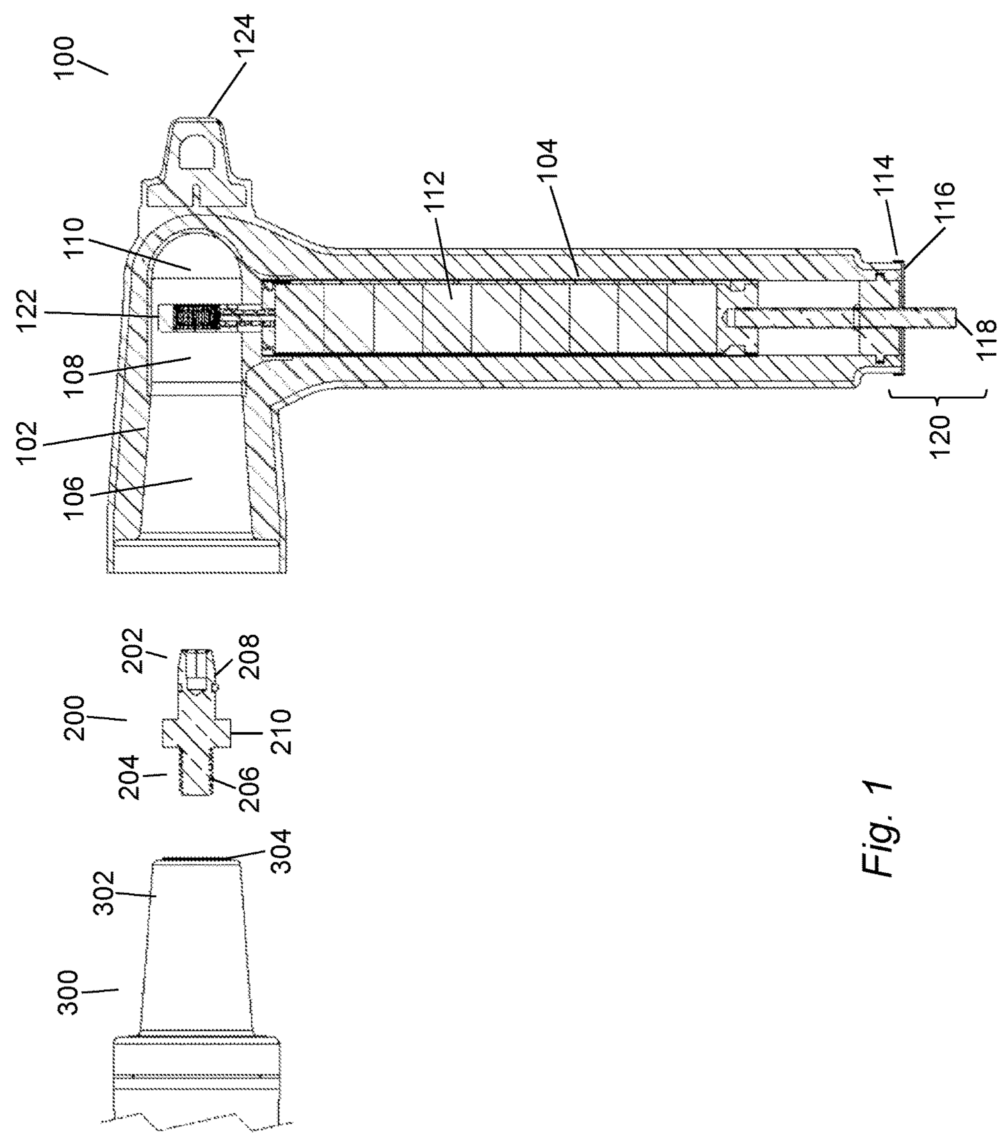
FIG. 1 illustrates a cross-sectional side view of an arrester according to the preferred embodiment.

Referring initially to FIG. 1, shown is arrester 100 in accordance with the preferred embodiment. Arrester 100 is coupled to cable accessory 300 using coupling fastener 200. While cable accessory 300 is depicted as a bolted-style bushing interface, a connecting plug or another electrical connector can be utilized. Arrester 100 includes receiving portion 102 and arrester portion 104. Pulling eye 124 is positioned substantially in line with receiving portion 102. Pulling eye 124 provides a location to connect a hot stick or other device for engaging or disengaging arrester 100 from cable accessory 300. Pulling eye 124 is preferably manufactured of stainless steel, and the external surface is surrounded by a shield layer consisting of semi-conductive ethylene propylene diene monomer (EPDM) or like material commonly utilized in the art. In the preferred embodiment, arrester 100 is electrically shielded, wherein the outer surface is an elastomer, such as EPDM rubber or the like. While arrester 100 is illustrated as having an elbow-like design, arrester 100 can be of other types and configurations known to one skilled in the art without departing from the broad inventive concepts disclosed herein.

A surge arrester 112, shown in FIG. 1 as a metal oxide varistor (MOV) arrester block stack, is located in arrester portion 104 of arrester 100. An end cap assembly 120 is attached to an end 114 of arrester portion 104. The end cap assembly 120 includes, but is not limited to, an end cap 116 and ground connector 118. Ground connector 118 is electrically coupled to surge arrester 112 located in arrester portion 104 of arrester 100. Further, ground connector 118 is configured to be connected to an external ground, and its composition can consist of various materials such as brass, stainless steel, and the like.

As shown, conductive contact 122 is electrically connected to surge arrester 112. In the preferred embodiment, conductive contact 122 is a lug-type connector and includes a louver. When cable accessory 300 is coupled to conductive contact 122 via bushing contact 304 and coupling fastener 200, the cable accessory is electrically coupled to surge arrester 112.

Receiving portion 102 preferably comprises cable accessory section 106, coupling fastener second section 108, and coupling fastener first section 110. As shown in FIG. 1, cable accessory section 106 is configured to mate with a male bushing interface (preferably a bolted-style bushing interface known in the art). Coupling fastener second section 108 is preferably configured to accommodate at least the length of contact 210 of coupling fastener 200, while coupling fastener first section 110 is configured to accommodate at least the length of first side 202 of coupling fastener 200.

Figure 2:
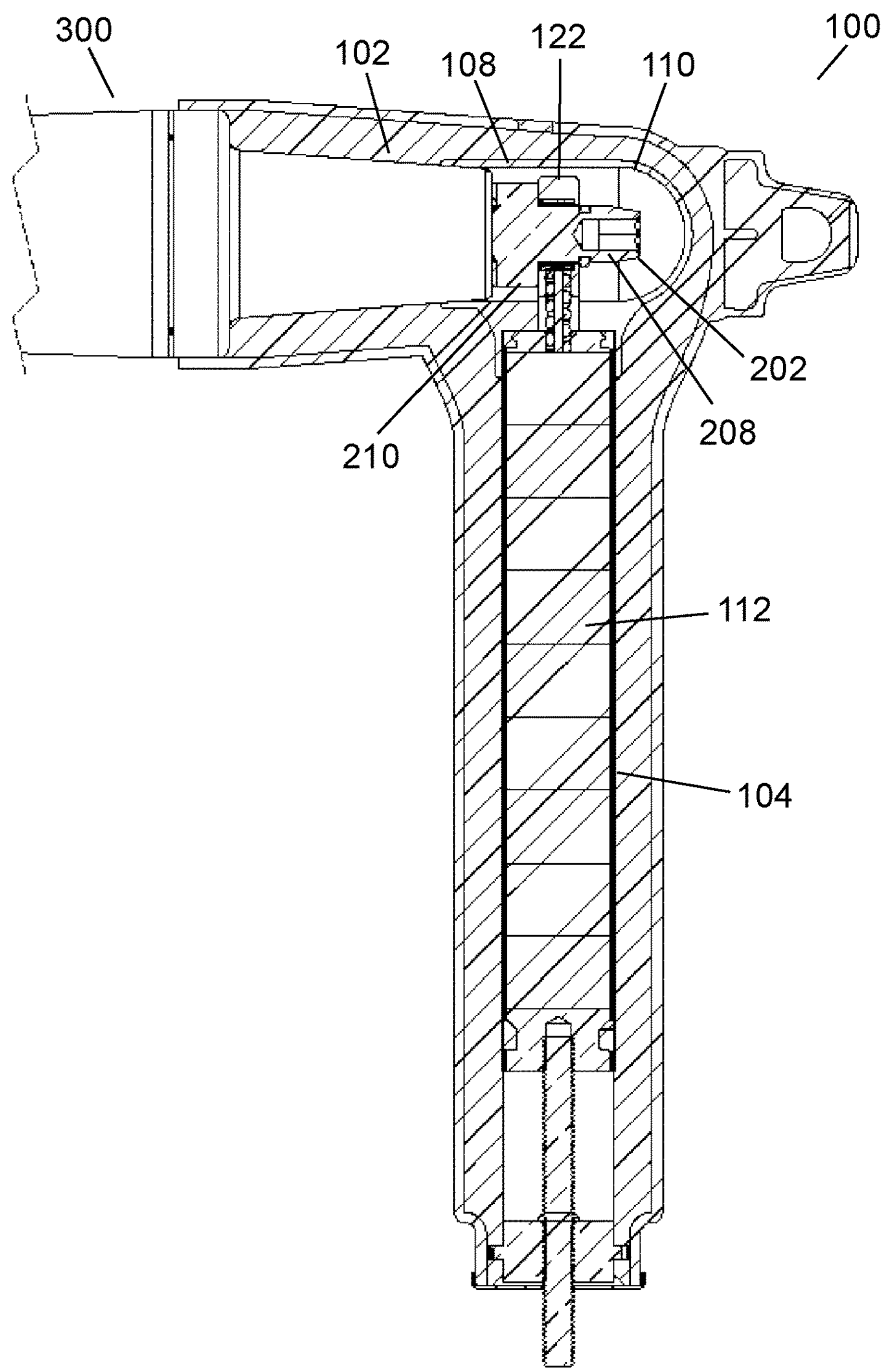
FIG. 2 illustrates a cross-sectional side view of the arrester shown in FIG. 1 coupled to a cable accessory with a coupling fastener.

Coupling fastener 200 comprises first side 202 and second side 204. Second side 204 is preferably configured to couple to cable accessory 300. In this embodiment, a male threaded portion 206 is positioned at second side 204. Male threaded portion 206 is configured to mate with cable accessory 300 via a female threaded portion in bushing contact 304. First side 202 is preferably configured to couple to conductive contact 122 of arrester 100. In this embodiment, latching mechanism 208 is positioned at first side 202. Latching mechanism 208 is preferably a snap ring, and as described in detail below with reference to FIG. 2, is configured to couple first side 202 of coupling fastener 200 to conductive contact 122. It would be readily apparent to one of ordinary skill in the art that alternative methods for latching (for example FIGS. 3A-3B, 4A-4B, 5, and 7) can be utilized without departing from the broad inventive concepts disclosed herein.

Coupling fastener 200 further comprises contact 210 located at an intermediate portion between first side 202 and second side 204. Contact 210 is preferably configured to abut with conductive contact 122 of arrester 100. In the preferred embodiment, contact 210 is a substantially cylindrical shape, but may also be square, rectangular, or hexagonally shaped to allow assembly rather than the broach shown in first side 202 of coupling fastener 200. The diameter of contact 210 is greater than the opening of conductive contact 122. It would be readily apparent to one of ordinary skill in the art to modify the shape of the contact without departing from the broad inventive concepts disclosed herein.

Cable accessory 300 preferably comprises bushing 302. Bushing 302 includes a bushing contact 304. In the preferred embodiment, bushing contact 304 is female threaded according to industry accepted specifications and is configured to receive male threaded portion 206 of coupling fastener 200.

Turning next to FIG. 2, shown is cable accessory 300 coupled to arrester 100 utilizing coupling fastener 200. First, the male threaded portion of coupling fastener 200 is threaded into the bushing contact of cable accessory 300. Thereafter, first side 202 of coupling fastener 200 is inserted into receiving portion 102 of arrester 100. The snap ring of latching mechanism 208 preferably contracts as first side 202 of coupling fastener 200 is inserted through conductive contact 122 of arrester 100. As shown in FIG. 2, cable accessory 300 is fully coupled to arrester 100 when contact 210 of coupling fastener 200 is located in coupling fastener second section 108 of arrester 100 and first side 202 of coupling fastener 200 is located in coupling fastener first section 110. Further, the snap ring of latching mechanism 208 of coupling fastener 200 is expanded to latch cable accessory 300 to arrester 100. It would be readily apparent to one of ordinary skill in the art that alternative methods for latching (for example FIGS. 3A-3B, 4A-4B, 5, and 7) can be utilized without departing from the broad inventive concepts disclosed herein.

FIGS. 3A-3B depict an embodiment for latching a coupling fastener with a conductive contact of an arrester in accordance with the broad inventive concepts disclosed herein. Coupling fastener 500 comprises first side 502 and second side 504. A contact 510 is positioned between first side 502 and second side 504. Second side 504 is configured to couple to a cable accessory (not shown) utilizing male threaded section 506. In this embodiment, latching mechanism 508 is positioned at first side 502. As shown, latching mechanism 508 comprises a detent that is configured to latch to conductive contact 422 of an arrester. In this embodiment, conductive contact 422 preferably includes a snap ring or spring that latches to latching mechanism 508 of coupling fastener 500. As coupling fastener 500 is inserted into an arrester (not shown), first side 502 passes through conductive contact 422 and compresses the snap ring. Further, as first side 502 passes through the snap ring, the snap ring expands into the detent of latching mechanism 508 to latch coupling fastener 500 to conductive contact 422. Thereby, a cable accessory (not shown) coupled to second side 504 of coupling fastener 500 is electrically coupled to surge arrester 412.

As shown in FIG. 3B, coupling fastener 500 is fully coupled to conductive contact 422. Contact 510 of coupling fastener 500 abuts conductive contact 422. Latching mechanism 508 is configured to latch to a snap ring or spring in conductive contact 422. In another embodiment, the latching mechanism can comprise a snap ring or spring that is configured to latch with a detent in the coupling fastener. In this embodiment, the method of electrically coupling a coupling fastener to a conductive contact utilizes a snap ring or spring within the conductive contact, unlike the use of a louver contact as described above in detail with reference to FIGS. 1-2.

FIGS. 4A-4B depict another embodiment for latching a coupling fastener with a conductive contact of an arrester in accordance with the broad inventive concepts disclosed herein. Coupling fastener 700 comprises first side 702 and second side 704. Second side 704 is configured to couple to a cable accessory (not shown) utilizing male threaded section 706. In this embodiment, latching mechanism 708 is positioned at first side 702. As shown, latching mechanism 708 comprises a plurality of segmented fingers 712. Each segmented finger 712 includes a step 714. As coupling fastener 700 is inserted into an arrester (not shown), first side 702 passes through conductive contact 622 and compresses the plurality of segmented fingers 712. As shown in FIG. 4B, coupling fastener 700 is fully coupled to conductive contact 622. Contact 710 of coupling fastener 700 abuts conductive contact 622. The step 714 of each segmented finger 712 latches coupling fastener 700 to conductive contact 622. In this embodiment, the method of electrically coupling a coupling fastener to a conductive contact utilizes segmented fingers, unlike the use of a louver contact, as described above in detail with reference to FIGS. 1-2, and the use of a snap ring or spring within a conductive contact, as described above in detail with reference to FIGS. 3A-3B.

Figure 5:
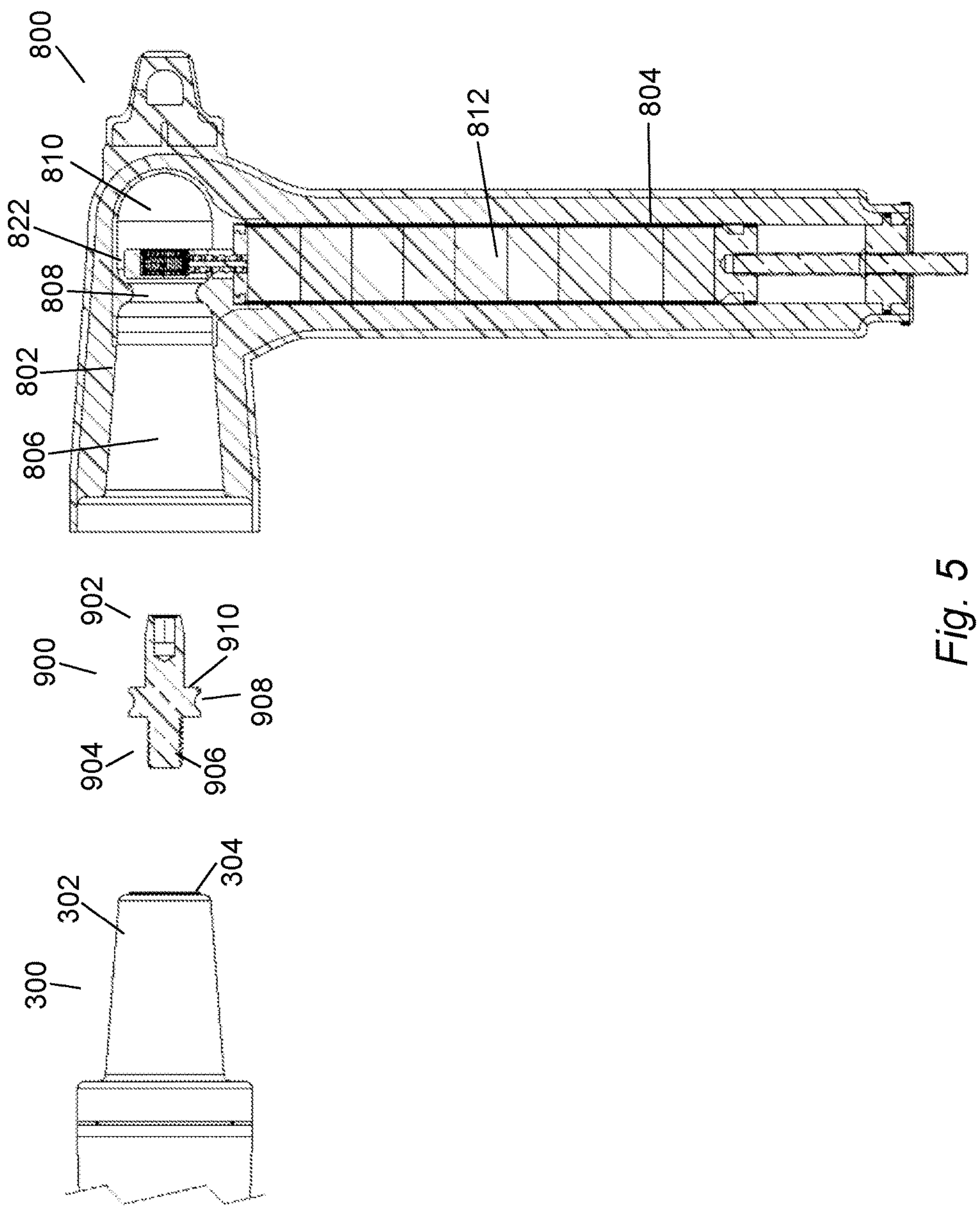
FIG. 5 illustrates a cross-sectional side view of an exemplary arrester according to an embodiment of the broad inventive concepts disclosed herein.

Turning next to FIG. 5, shown is an embodiment of arrester 800 in accordance with the broad inventive concepts disclosed herein. Arrester 800 is coupled to a cable accessory 300 utilizing coupling fastener 900. Arrester 800 includes receiving feature 802 and arrester portion 804. A surge arrester 812 is located in arrester portion 804 of arrester 800. As shown, conductive contact 822 is electrically coupled to surge arrester 812.

In this embodiment, receiving portion 802 comprises cable accessory section 806, coupling fastener second section 808, and coupling fastener first section 810. As shown in FIG. 5, cable accessory section 806 is configured to mate with a male bushing interface (preferably a bolted-style bushing interface known in the art). Coupling fastener second section 808 is preferably configured to couple to latching mechanism 908 of coupling fastener 900, while coupling fastener first section 810 is configured to accommodate at least the length of first side 902 of coupling fastener 900. In this embodiment, coupling fastener second section 808 includes an integrally molded ring.

Coupling fastener 900 comprises first side 902 and second side 904. Contact 910 is configured to abut conductive contact 822 of arrester 800. Second side 904 is configured to couple to a cable accessory (not shown) utilizing male threaded section 906. In this embodiment, latching mechanism 908 is positioned between first side 902 and second side 904. As shown, latching mechanism 908 comprises a detent that is configured to latch to coupling fastener second section 808 utilizing an interference fit.

Figure 6:
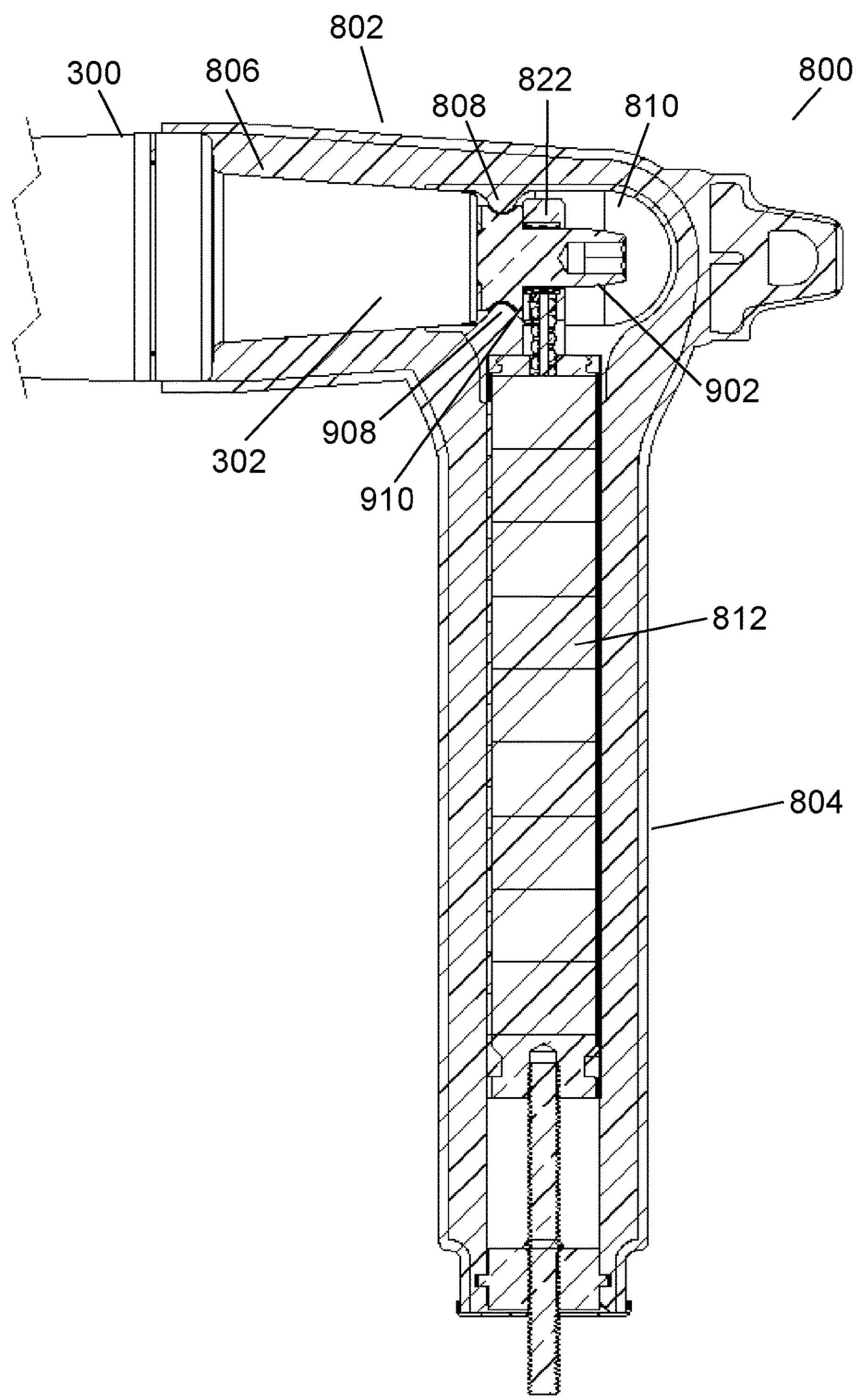
FIG. 6 illustrates a cross-sectional side view of the arrester shown in FIG. 5 coupled to a cable accessory with an exemplary coupling fastener.

Turning next to FIG. 6, shown is cable accessory 300 coupled to arrester 800 utilizing coupling fastener 900. First, the male threaded portion of coupling fastener 900 is threaded into the bushing contact of cable accessory 300. Thereafter, first side 902 of coupling fastener 900 is inserted into receiving portion 802 of arrester 800. The detent of latching mechanism 908 interference fits with coupling fastener second section 808 as first side 902 of coupling fastener 900 is inserted through conductive contact 822 of arrester 800. As shown in FIG. 6, cable accessory 300 is fully coupled to arrester 800 when contact 910 of coupling fastener 900 abuts conductive contact 822.

Figure 7:
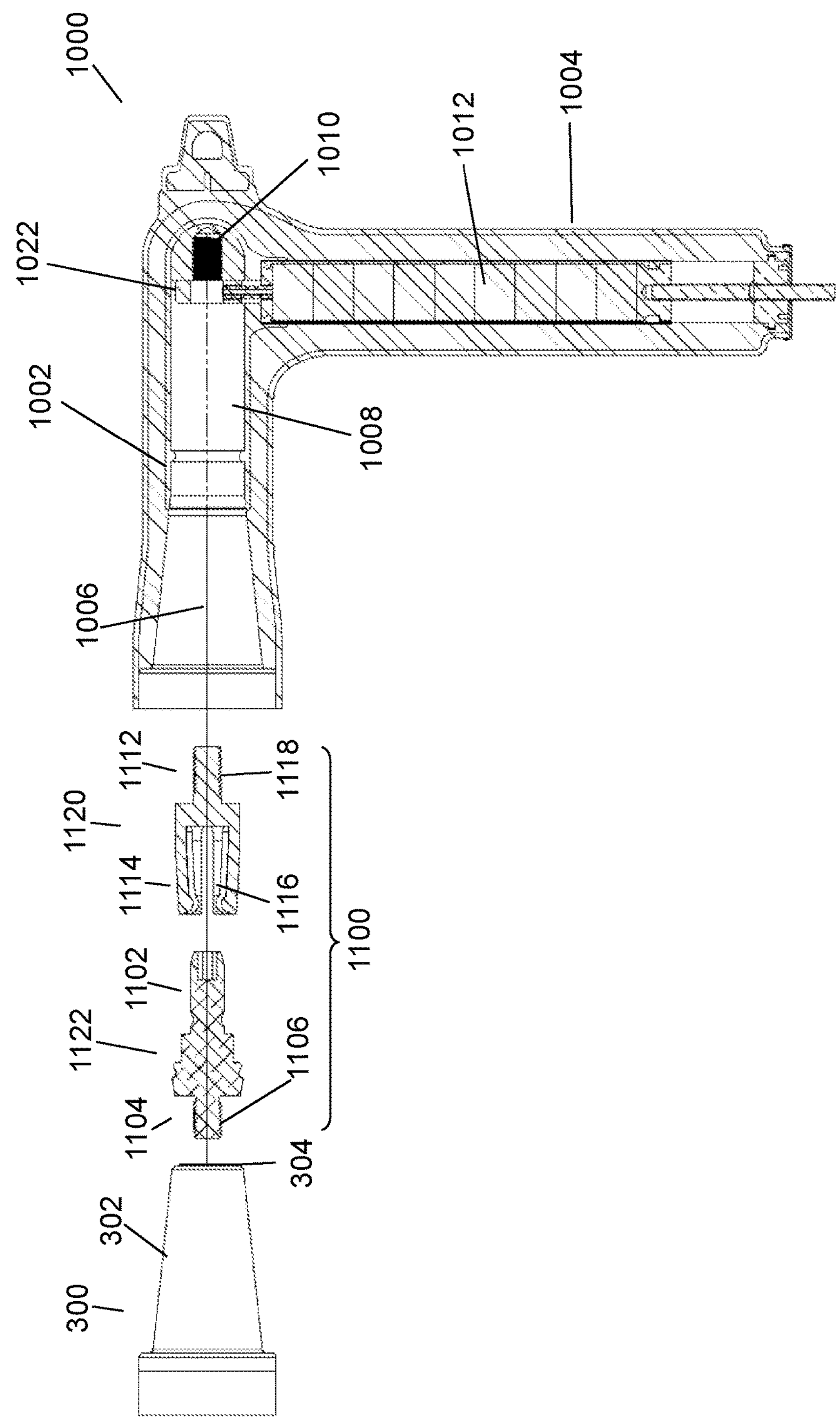
FIG. 7 illustrates a cross-sectional side view of an exemplary arrester according to an embodiment of the broad inventive concepts disclosed herein.

Various methods of electrically coupling a coupling fastener to an arrester have been disclosed herein. FIGS. 1-2, and 5-6 depict an exemplary louvre, FIGS. 3A-3B depict an exemplary spring or snap ring configured to couple to a detent, and FIGS. 4A-4B depict exemplary segmented fingers. In yet another embodiment, FIG. 7 depicts a method for latching a coupling fastener and electrically coupling a cable accessory to an arrester in accordance with the broad inventive concepts disclosed herein. Arrester 1000 is coupled to a cable accessory 300 utilizing coupling fastener 1100. In this embodiment, coupling fastener 1100 comprises first component 1120 and second component 1122. Arrester 1000 includes receiving feature 1002 and arrester portion 1004. A surge arrester 1012 is located in arrester portion 1007. Further, conductive contact 1022 is coupled to surge arrester 1012.

In this embodiment, receiving portion 1002 comprises cable accessory section 1006, coupling fastener second section 1008, and coupling fastener first section 1010. As shown in FIG. 7, cable accessory section 1006 is configured to mate with a male bushing interface (preferably a bolted-style interface known in the art). In this embodiment, coupling faster second section 1008 is preferably configured to accommodate the length of first component 1120 of coupling fastener 1100, while coupling fastener first section 1010 is configured to couple to first side 1112 of first component 1120 when connected. Coupling fastener first section 1010 preferably comprises a female threaded portion.

Coupling fastener 1100 comprises first component 1120 that is removably coupled to second component 1122. First component 1120 comprises first side 1112 and second side 1114. Second side 1114 of first component 1120 is configured to couple to second component 1122. In this embodiment, a receiving portion 1116 is located on second side 1114. Receiving portion 1116 is configured to couple to first end 1102 of second component 1122 utilizing an interference fit. First side 1112 of first component 1120 is configured to couple to coupling fastener first section 1010 of arrester 1000. As shown, latching mechanism 1118 comprises a male threaded portion configured to couple to coupling fastener first section 1010 of arrester 1000.

Second component 1122 comprising first side 1102 and second side 1104. Second side 1104 is preferably configured to couple to cable accessory 300. In this embodiment, a male threaded portion 1106 is positioned at second side 1104. Male threaded portion 1106 is configured to mate with a female threaded portion in cable accessory 300. First side 1102 is preferably configured to couple second component 1122 to first component 1120.

Figure 8:
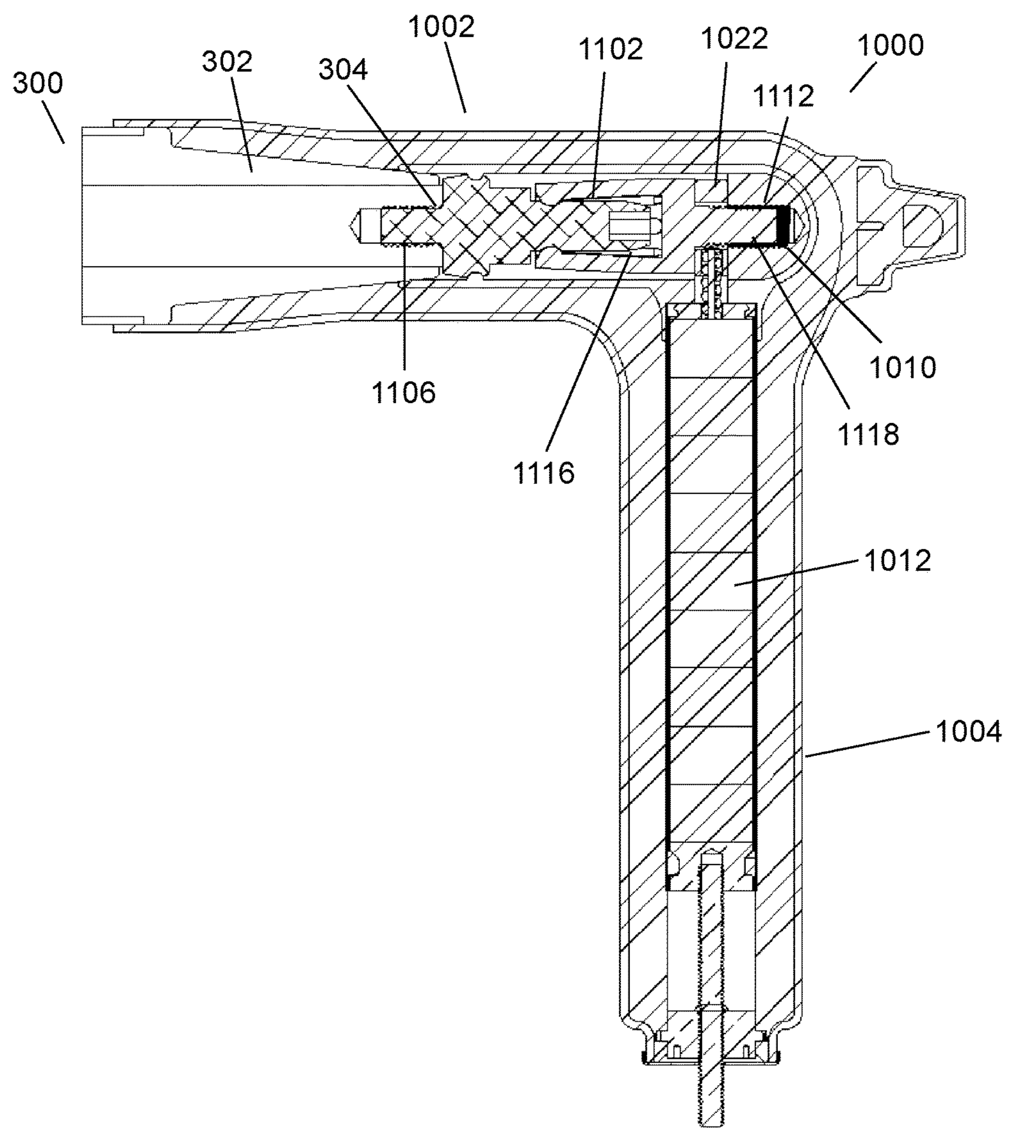
FIG. 8 illustrates a cross-sectional side view of the arrester shown in FIG. 7 coupled to a cable accessory with an exemplary coupling fastener.

Turning next to FIG. 8, shown is cable accessory 300 coupled to arrester 1000 utilizing coupling fastener 1100. The process begins with inserting the threaded portion of first side 1112 of first component 1120 of coupling fastener 1100 into coupling fastener first section 1010 of arrester 1000. As a result, first component 1120 of coupling fastener 1100 is electrically coupled to arrester 1012 of arrester 1000. Next, the male threaded portion 1106 of second component 1122 of coupling fastener 1100 is threaded into the bushing contact of cable accessory 300. Thereafter, first side 1102 of second component 1122 is inserted into receiving portion 1002 of arrester 1000 until first side 1102 couples to receiving portion 1116 of second component 1120. Cable accessory 300 is electrically coupled to surge arrester 1012 when second component 1122 of coupling fastener 1100 is fully coupled to first component 1120 of coupling fastener 1100.

Figure 9A:
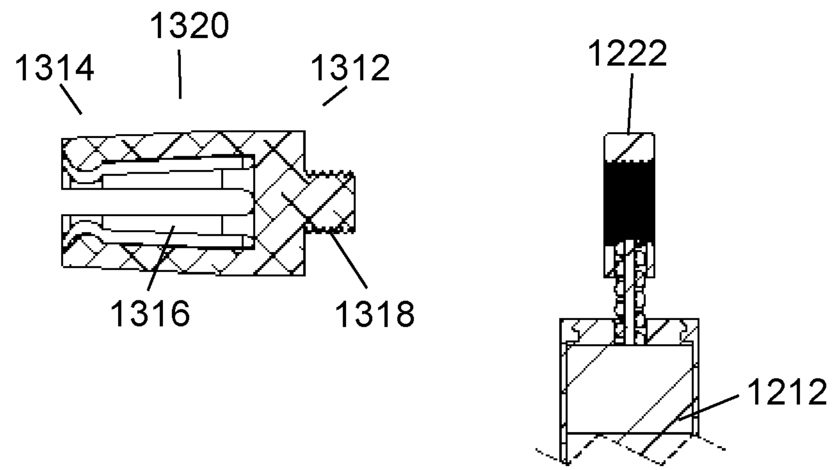
FIG. 9A illustrates a cross-sectional side view of an exemplary coupling fastener according to an embodiment of the broad inventive concepts disclosed herein.
Figure 9B:
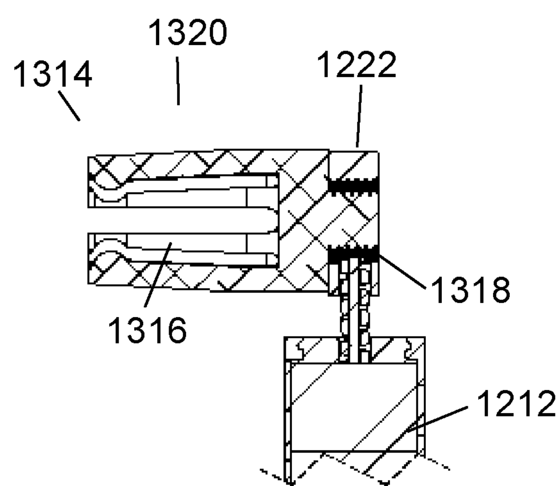
FIG. 9B illustrates a cross-sectional side view of the coupling fastener shown in FIG. 9A coupled to an exemplary arrester.

FIGS. 9A-9B depict another embodiment for latching a coupling fastener with a conductive contact of an arrester in accordance with the broad inventive concepts disclosed herein. A coupling fastener (not shown) comprises first component 1320 that is removably coupled to a second component (not shown) of the coupling fastener. Second side 1314 of first component 1320 is configured to couple to the second component of a coupling fastener. In this embodiment, a receiving portion 1316 is located on second side 1314. Receiving portion 1316 is configured to couple to the second component of a coupling fastener utilizing an interference fit. As shown in FIG. 9A, first side 1312 of first component 1320 is configured to couple to conductive contact 1222 of an arrester. In this embodiment, latching mechanism 1318 comprises a male threaded portion configured to threadably insert into conductive contact 1222 of an arrester. Turning to FIG. 9B, first component 1320 is coupled to conductive contact 1222. As a result, first component 1320 is electrically coupled to surge arrester 1212.

While the inventive concepts have been described with reference to the preferred embodiment, which has been set forth in considerable detail for the purposes of making a complete disclosure, the disclosed embodiments are merely exemplary and are not intended to be limiting or represent an exhaustive enumeration of all aspects of the broad inventive concepts disclosed herein. It will be apparent to those of skill in the art that numerous changes may be made in such details without departing from the spirit and the principles of the inventive concepts disclosed herein. It should be appreciated that the inventive concepts disclosed herein are capable of being embodied in other forms without departing from their essential characteristics.

What is claimed is:

1. An arrester, comprising:
a body comprising:
a surge arrester portion,
a receiving portion, and
a conductive contact;
a coupling fastener comprising:
a first side,
a second side, and
a latching mechanism;
wherein the first side of the coupling fastener is configured to couple to the conductive contact;
wherein the second side of the coupling fastener is configured to couple to a cable accessory; and
wherein the latching mechanism comprises a snap ring and wherein the conductive contact comprises a detent.

2. An arrester, comprising:
a body comprising:
a surge arrester portion,
a receiving portion, and
a conductive contact;
a coupling fastener comprising:
a first side,
a second side, and
a latching mechanism;
wherein the first side of the coupling fastener is configured to couple to the conductive contact;
wherein the second side of the coupling fastener is configured to couple to a cable accessory; and
wherein the latching mechanism comprises a detent and wherein the conductive contact comprises a snap ring.

3. A method comprising the steps of:
coupling a cable accessory to a second side of a coupling fastener comprising a first side, the second side and a latching mechanism;
inserting the first side of the coupling fastener into a receiving portion of an arrester comprising a surge arrester portion, the receiving portion, and a conductive contact;
inserting the first side of the coupling fastener through the conductive contact of the arrester;
latching the latching mechanism of the coupling fastener to the conductive contact of the arrester;
electrically coupling the cable accessory coupled to the second side of the coupling fastener to a surge arrester located in the surge arrester portion of the arrester; and
wherein the step of inserting the first side of the coupling fastener to the conductive contact of the arrester comprises, compressing a snap ring of the conductive contact.

4. A method comprising the steps of:
coupling a cable accessory to a second side of a coupling fastener comprising a first side, the second side and a latching mechanism;
inserting the first side of the coupling fastener into a receiving portion of an arrester comprising a surge arrester portion, the receiving portion, and a conductive contact;
inserting the first side of the coupling fastener through the conductive contact of the arrester;
latching the latching mechanism of the coupling fastener to the conductive contact of the arrester;
electrically coupling the cable accessory coupled to the second side of the coupling fastener to a surge arrester located in the surge arrester portion of the arrester; and
wherein the step of inserting the first side of the coupling fastener to the conductive contact of the arrester comprises, compressing a snap ring of the latching mechanism.

5. A method comprising the steps of:

coupling a cable accessory to a second side of a coupling fastener comprising a first side, the second side and a latching mechanism;

inserting the first side of the coupling fastener into a receiving portion of an arrester comprising a surge arrester portion, the receiving portion, and a conductive contact;

inserting the first side of the coupling fastener through the conductive contact of the arrester;

latching the latching mechanism of the coupling fastener to the conductive contact of the arrester;

electrically coupling the cable accessory coupled to the second side of the coupling fastener to a surge arrester located in the surge arrester portion of the arrester; and wherein the step of inserting the first side of the coupling fastener to the conductive contact of the arrester comprises, compressing a plurality of fingers of the latching mechanism.

* * * * *